US009321170B2

(12) United States Patent
Avis

(10) Patent No.: US 9,321,170 B2
(45) Date of Patent: Apr. 26, 2016

(54) SUBFRAME HOLDER DEVICE

(71) Applicant: Steven Avis, Berwyn, PA (US)

(72) Inventor: Steven Avis, Berwyn, PA (US)

(*) Notice: Subject to any disclaimer, the term of this patent is extended or adjusted under 35 U.S.C. 154(b) by 33 days.

(21) Appl. No.: 14/489,797

(22) Filed: Sep. 18, 2014

(65) Prior Publication Data

US 2016/0082586 A1 Mar. 24, 2016

(51) Int. Cl.
*B23Q 3/00* (2006.01)
*B25H 5/00* (2006.01)

(52) U.S. Cl.
CPC .................................... *B25H 5/00* (2013.01)

(58) Field of Classification Search
USPC .................................. 269/289 R, 296, 299
See application file for complete search history.

(56) References Cited

U.S. PATENT DOCUMENTS 4,984,814 A * 1/1991 Graffunder ........... B62B 5/0003 280/35
5,599,031 A * 2/1997 Hodges ................. B62B 5/0083 280/35
6,397,965 B1 * 6/2002 McFarlane ........... B25H 1/0007 180/298

* cited by examiner

*Primary Examiner* — Lee D Wilson
*Assistant Examiner* — Shantese McDonald
(74) *Attorney, Agent, or Firm* — The Law Office of Jerry D. Haynes

(57) ABSTRACT

A subframe holding device to remove a vehicle subframe comprising a frame, where the frame includes a first pair of rods and a second pair of rods, where the first pair of rods intersect the second pair of rods at four intersections; a set of connection sleeves through which the first pair of rods pass, where the set of connection sleeve attach the second pair of rods to the first pair of rods; a mount at each intersection, where the mount is fastened to the second pair of rods, and where the mount fastens against the vehicle subframe; and a support plate attached to the first pair of rods between the second pair of rods, where the support plate bolts to a jack, where the jack elevates the support plate thereby raising the frame to attach the mounts to the subframe.

8 Claims, 1 Drawing Sheet

SUBFRAME HOLDER DEVICE

BACKGROUND OF THE INVENTION

1. Field of the Invention

The present invention relates to a device to hold a vehicle subframe to ensure that the subframe remains supported and stable while working on a vehicle.

2. Description of Related Art

Vehicle repairs and tune ups typically require a knowledgeable technician working at a professional garage. The garages contain the specialized equipment able extract, lift and reach the components of the automobile. Some people prefer working at home and have some of the basic equipment to allow them to work from their home garage. Whether at home or at a professional garage, the skill and knowledge about vehicle repair is still a necessity to ensure that the fixes are performed correctly for safety.

An area of routine frustration is working with the vehicle's subframe. Installing and removing the subframe can be cumbersome due to the heavy weight of the frames and the requirement of additional individuals to extract and reinstall the frame. Typically, when removing a subframe four people are needed to grab, balance and hold the frame. This requires three additional helpers to stop what they're doing to assist extracting the single piece. Moreover, the subframes are prone to misalignment, which can cause vibration and placement issues in the suspension and steering components when the frame is installed incorrectly. This is dangerous to the driver and passengers when traveling in the vehicle.

Therefore it would be beneficial in the art to provide a tool that helps remove a subframe without requiring additional people. It would also be desirable in the art to provide a tool that adjusts to customize the fit of the tool to the specific subframe.

SUMMARY OF THE INVENTION

In view of the foregoing disadvantages inherent in the prior art, the general purpose of the present invention is to provide a subframe holding device to remove a vehicle subframe, configured to include all of the advantages of the prior art, and to overcome the drawbacks inherent therein.

Accordingly, an object of the present invention is to provide a subframe holding device that is attached to and lifted by a jack to attach to a vehicle subframe, therefore relieving the requirement of asking additional people for help.

Another object of the present invention is to provide a subframe holding device that easily adjusts to the size of the subframe for a tight secure hold on the specific subframe.

To achieve the above objects, in an aspect of the present invention, a subframe holding device is described comprising a frame, where the frame includes a first pair of rods and a second pair of rods, where the first pair of rods intersect the second pair of rods at four intersections; a set of connection sleeves through which the first pair of rods pass, where the set of connection sleeve attach the second pair of rods to the first pair of rods; a mount at each intersection, where the mount is fastened to the second pair of rods, and where the mount fastens against the vehicle subframe; and a support plate attached to the first pair of rods between the second pair of rods, where the support plate bolts to a jack, where the jack elevates the support plate thereby raising the frame to attach the mounts to the subframe.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a device to hold a vehicle subframe to ensure that the subframe remains supported and stable while working on a vehicle. The present invention provides a subframe holding device to facilitate the process of removing and installing subframes, as well as performing major repairs on vehicles. The subframe holding device includes a frame with a central plate. The frame includes adjustable mounts which receive the subframe. The frame is fastened beneath the undercarriage of the vehicle, and then the subframe may be easily removed without difficulty or hassle. With the subframe holding device the user is afforded a unique tool that adjusts to the specific subframe size needed when working on a vehicle.

Figure 1:
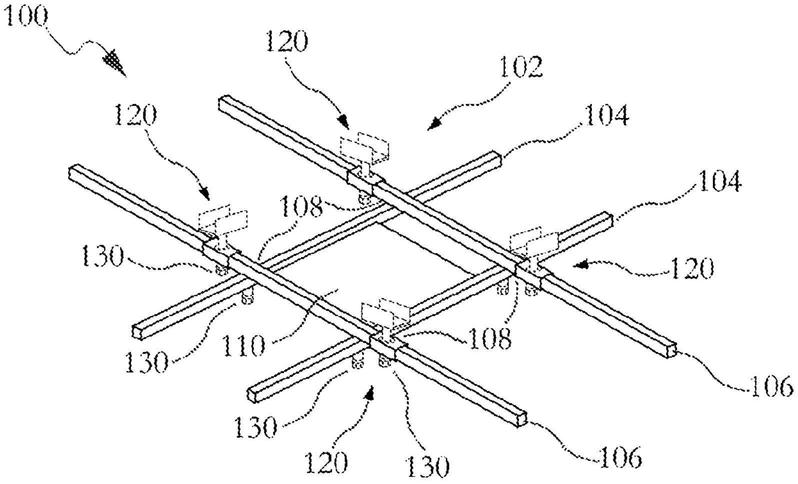
FIG. 1 depicts a perspective view of a subframe holding device in accordance with an exemplary embodiment of the present invention.

Turning now descriptively to the drawings, referring to FIG. 1, a perspective view of a subframe holding device 100 is shown in accordance with an exemplary embodiment of the present invention. The subframe holding device 100 includes a frame 102 upon which a subframe is secured. The frame 102 includes a first pair of rods 104 and a second pair of rods 106, where each rod in the pair aligns parallel to the other. The first pair of rods 104 is positioned beneath the second pair of rods 106. The first rods 104 and the second rods 106 may be hollow, square rods to provide a lightweight structure and to prevent twisting and shifting during use.

The first rods 104 and the second rods 106 are positioned perpendicular to each other to create a square crisscross pattern with four intersections 108. The intersections 108 are adjustable along the first rods 104 and the second rods 106 to ensure a proper fit on the subframe. Welded or bolted to the first rods 104, positioned between the second rods 106 is a support plate 110. The support plate 110 bolts to a transmission jack to position the frame 102 beneath the subframe before detachment. The frame 102 and support plate 110 are made from steel to withstand the weight of the subframe and the tough conditions encountered in a garage or repair shop.

At each intersection 108 is a mount 120 upon which the subframe is secured. The mounts 120 are attached to the second rods 106. During use, the mounts 120 may be adjusted as needed to efficiently hold the subframe. Beneath each mount 120 may be a fastener 130 extending from the second rods 106. Similarly, the first rods 104 may have a fastener 130 extending from each intersection 108. The fasteners 130 attach the first rods 104 to the second rods 106, and the mounts 120 to the second rods 106.

Figure 2:
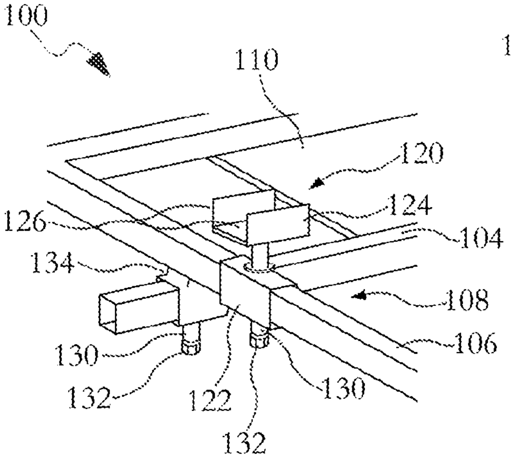
FIG. 2 depicts an enlarged view of a mount in accordance with an exemplary embodiment of the present invention.

Referring now to FIG. 2, an enlarged view of the mount 120 is shown in accordance with an exemplary embodiment of the present invention. The mount 120 includes a sleeve 122 through which the second rod 106 passes. Similarly, the first rods 104 slide through a connection sleeve 134 at each intersection 108, where the connection sleeve 134 attaches the rods 104, 106 together. From the sleeve 122, a saddle mount 120 may extend comprised of a platform 124 with a pair of arms 126. The saddle mount 120 receives the subframe to attach it to the frame 102. The saddle mount 120 may rotate so that the arms 126 easily accommodate the subframe.

Beneath each sleeve 122, 134 is a fastener 130. The fasteners 130 tighten the rods 104, 106 within the sleeves 122, 134. Each fastener 130 includes a pin 132 to tighten the sleeve 122, 134 as needed around the rods 104, 106. Likewise, the pin 132 may also loosen the sleeve 122, 134 to adjust the rods 104, 106. The pin 132 may be a bolt or retractable spring pin depending on the likes and preferences of the user.

Figure 3:
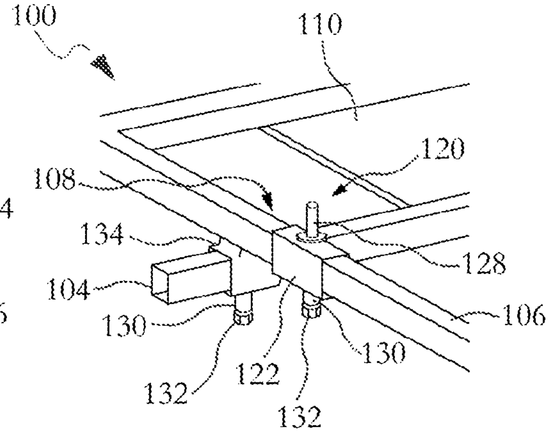
FIG. 3 depicts an enlarged view of a mount in accordance with an alternative embodiment of the present invention.

Referring now to FIG. 3, an enlarged view of a pin mount 120 is shown in accordance with an alternative embodiment of the present invention. The pin mount 120 includes the sleeve 122 and fasteners 130 as illustrated in FIG. 2 with the saddle mount, but the pin mount 120 provides an alternative attachment method to the subframe. The pin mount 120 includes a pin 128 received by the subframe to fasten the subframe against the frame 102. With either the saddle mount or the pin mount, the frame 102 is able to tightly anchor the subframe to the subframe holding device 100. This way the use is able to work independently without having to seek assistance when removing the subframe from the undercarriage of a vehicle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A subframe holding device to remove a vehicle subframe comprising:

a. a frame, where the frame includes a first pair of rods and a second pair of rods, where the first pair of rods intersect the second pair of rods at four intersections;

b. a set of connection sleeves through which the first pair of rods pass, where the set of connection sleeve attach the second pair of rods to the first pair of rods;

c. a mount at each intersection, where the mount is fastened to the second pair of rods, and where the mount fastens against the vehicle subframe; and d. a support plate attached to the first pair of rods between the second pair of rods, where the support plate bolts to a jack, where the jack elevates the support plate thereby raising the frame to attach the mounts to the subframe.

2. The subframe holding device according to claim 1, where the rods of the first pair of rods are positioned parallel to each other, and the rods of the second pair of rods are positioned parallel to each other, thus when the second pair of rods overlap the first pair of rods a crisscross square is formed.

3. The subframe holding device according to claim 1, where the mount includes a sleeve through which the second pair of rods pass.

4. The subframe holding device according to claim 1, where the mount is a saddle mount, where the saddle mount includes a platform with a pair of arms to receive the subframe.

5. The subframe holding device according to claim 1, where the mount is a pin mount, where the pin mount includes a pin received by the subframe to attach the subframe to the frame.

6. The subframe holding device according to claim 1, where the mount includes a fastener, where the fastener tightens the mount to the second pair of rods with a pin.

7. The subframe holding device according to claim 1, where each connection sleeve includes a fastener, where the fastener tightens the connection sleeve to the first rod with a pin.

8. The subframe holding device according to claim 1, where the first pair of rods and the second pair of rods are square rods.

* * * * *